United States Patent [19]

Kral et al.

[11] Patent Number: 5,034,364

[45] Date of Patent: Jul. 23, 1991

[54] MULTIPLE CHROMIUM COMPOUND-CONTAINING CATALYST COMPOSITION AND OLEFIN POLYMERIZATION THEREWITH

[75] Inventors: Bohumil V. Kral, Victoria, Australia; Grace O. Tsien, Colonia, N.J.; Chisung Wu, Beaumont, Tex.

[73] Assignee: Mobil Oil Corporation, Fairfax, Va.

[21] Appl. No.: 438,814

[22] Filed: Nov. 9, 1989

[51] Int. Cl.$^5$ .............. B01J 21/04; B01J 21/08; B01J 23/26; C08F 4/24; C08F 4/16
[52] U.S. Cl. ................... 502/117; 502/158; 502/256; 502/319; 526/101; 526/96; 526/97; 526/104; 526/106
[58] Field of Search .............. 526/101, 97, 96, 106, 526/104; 502/158, 117, 256, 319

[56] References Cited

U.S. PATENT DOCUMENTS

| | | |
|---|---|---|
| 2,825,721 | 3/1958 | Hogan et al. |
| 3,023,203 | 2/1962 | Dye .................................. 526/106 |
| 3,324,095 | 6/1967 | Carrick et al. ..................... 260/88.2 |
| 3,324,101 | 6/1967 | Baker et al. ......................... 526/126 |
| 3,622,521 | 11/1971 | Hogan et al. ....................... 252/430 |
| 3,704,287 | 11/1972 | Johnson ............................ 260/94.9 |

Primary Examiner—Joseph L. Schofer
Assistant Examiner—Tom Weber
Attorney, Agent, or Firm—Alexander J. McKillop; Charles J. Speciale; Marina V. Schneller

[57] ABSTRACT

An olefin, particularly alpha-olefin, polymerization catalyst composition, supported on a refractory oxide support comprises two chromium specie: (1) $CrO_3$ or any chromium compound calcinable to $CrO_3$; and (2) at least one silylchromate compound. The composition is prepared by sequentially depositing specie (1) and (2) onto the same support.

30 Claims, No Drawings

MULTIPLE CHROMIUM COMPOUND-CONTAINING CATALYST COMPOSITION AND OLEFIN POLYMERIZATION THEREWITH

BACKGROUND OF THE INVENTION

1. Field of the Invention

The present invention is directed to a chromium compound-containing catalyst for polymerizing olefins, particularly alpha-olefins, also known as 1-olefins, comprising at least two different chromium species and to a method of polymerizing such olefins in the presence of the catalyst of this invention. More particularly, the invention is directed to a method of producing polymers of ethylene or copolymers of ethylene and at least one $C_3$-$C_{10}$ alpha-olefin, which are useful in the fabrication of high strength films.

2. Description of Related Art

Chromium compound-containing alpha-olefin polymerization catalysts, also known as Phillips catalysts, have been extensively described in the literature. They are formed by supporting chromium or a compound of chromium, e.g., chromium trioxide, or a compound calcinable thereto, on a refractory oxide support material, for example, silica, alumina, zirconia, thoria or silica-alumina, and heating the oxide support material in a non-reducing atmosphere, preferably an oxidizing atmosphere, to produce an active polymerization catalyst. The produced catalyst is used to polymerize olefins, usually 1-olefins, in a suitable process, such as the so-called "solution form" or "particle form" process. In the "solution form" process, the monomeric olefin, which is normally ethylene or a mixture of ethylene with up to about 40 wt. % of other 1-olefins, is contacted with a suspension of the catalyst in a liquid hydrocarbon which is a solvent for the polymer at the polymerization temperature employed. In the "particle form" process, the monomer olefin is contacted with a suspension or a fluidized bed of the catalyst particles in a fluid medium under conditions such that the polymeric olefin forms as solid particles suspended in or fluidized in the fluid medium. The fluid medium can be, for example, a liquid hydrocarbon or a gas. Examples of suitable liquid hydrocarbons are isobutane and n-pentane. Examples of suitable gases are nitrogen or argon mixed with the gaseous monomer, or the undiluted gaseous monomer. Processes of this type are described in, for example, U.K. published patent specifications 790,195; 704,641; 853,414; 886,784 and 899,156. It is also known to modify such catalysts with a titanium compound, for example, to render the catalyst capable of producing polyolefins having increased melt index (i.e., lower average molecular weight) or to increase the stress crack resistance of the produced polyolefin. Catalysts of this type are described in, for example, U.S. Pat. No. 3,622,521 to Hogan et al and U.K. published patent specifications 1,334,662 and 1,326,167.

U.S. Pat. No. 3,351,623 to Walker et al discloses a catalyst for polymerizing ethylene at a temperature in the range of 275° to 335° F. under solution form process conditions, the catalyst being one which forms on mixing (1) an oxide component selected from the group consisting of silica; mixtures of silica and alumina containing up to 25 wt. % alumina; and mixtures of chromium oxide and at least one material selected from the group consisting of silica, alumina, zirconia and thoria, at least part of the chromium oxide being in the hexavalent state at the initial contacting of the monomer therewith, (2) an organo metallic component of formula $R_xM$ where R is selected from the group consisting of hydrogen and alkyl, aryl, cycloalkyl, alkoxy radicals and combinations of these radicals containing up to 12 carbon atoms, at least one R group being a hydrocarbon radical; M is selected from the group consisting of aluminum, gallium, indium, thallium, zinc, boron, lead, lithium, zirconium, cobalt, magnesium and tin; and x is an integer equal to the valence of M, and (3) a vanadium component selected from the group consisting of vanadium chelates and vanadyl chelates. Walker et al seek to produce a catalyst that permits the use of high polymerization temperatures to obtain relatively low melt index polymers.

Downs, U.S. Pat. No. 4,368,302, discloses a modified alpha-olefin catalyst composition used in preparing polymers of ethylene or copolymers of ethylene and higher alpha-olefins, having high average molecular weight and a relatively broad molecular weight distribution, as evidenced by relatively high values of melt flow ratio (MFR), referred to by Downs as melt index ratio (MIR). The catalyst composition of Downs is prepared by supporting chromium oxide on a refractory oxide support material, adding at least one tetravalent titanium compound and heating to activate the product. The monomer is contacted with the active polymerization catalyst in the presence of one or more organometallic compounds, e.g., dibutylmagnesium or triethylaluminum. The amount of the organometallic compounds is 0.1-100% by weight (wt %), preferably 1 to 10 wt %. The refractory oxide support has a mean particle diameter of about 20-150 microns ($\mu$).

U.K. Patent Application 2,023,153 to Eve discloses an ethylene polymerization catalyst comprising: (A) a heat activated supported chromium oxide catalyst, and (B) a catalyst modifier comprising a magnesium compound, such as a dialkyl magnesium, preferably dibutyl magnesium, and a commercially available product believed to comprise a mixture of dibutyl magnesium, dialkyl magnesium and butyl-alkyl magnesium. The polymerization process, conducted in the presence of this catalyst, produces polyethylene or ethylene and higher alpha-olefin copolymers having broad molecular weight distribution and low melt index. The quantity of the catalyst modifier is such that the atomic ratio of magnesium to chromium in the modified catalyst system is 0.01:1 to 100:1, preferably, 0.01:1 to 10:1.

Stricklen et al., U.S. Pat. No. 4,374,234, disclose a silica-supported chromium catalyst to which is added up to 5 ppm of an aluminumalkyl or dihydrocarbomagnesium compound, e.g., dibutylmagnesium, in order to reduce the induction period and increase catalyst activity. The addition of the aluminum or the magnesium compounds has only a modest effect on polymer properties.

Most of the previously-known Phillips catalyst compositions were used to produce high density, medium and low molecular weight products. It is desirable, however, to have a Phillips' catalyst composition capable of producing high molecular weight, high density olefin polymers which are used to manufacture superior strength films, considered to be premium commercial products.

SUMMARY OF THE INVENTION

An olefin, particularly alpha-olefin, polymerization catalyst composition, supported on a refractroy oxide support, comprises two catalytically-active components also referred to herein as "chromium specie": $CrO_3$ or any compound of chromium calcinable to $CrO_3$; or any compound of chromium calcinable to $CrO_3$; and at least one silychromate compound. The composition is prepared by depositing the two chromium specie sequentially onto the same support.

The catalyst composition polymerizes olefins, particularly alpha-olefins, to resins which produce high molecular weight, high density films having substantially improved strength properties, as compared to films made from resins polymerized with either one of the catalytically-active components.

DETAILED DESCRIPTION OF THE INVENTION

The support material used in the synthesis of the catalyst of this invention is any catalytic support known in the art. The support is usually an inorganic, solid, particulate porous material inert to the other components of the catalyst composition and to any other active components of the reaction system. Thus, suitable supports are inorganic materials, such as oxides of silicon and/or aluminum, e.g., silica, silica-alumina, silica-titania, alumina, zirconia or thoria. The support is porous and it must have surface area of at least about 3 $m^2/g$, and preferably at least about $50m^2/g$. It is preferred that the support be dried prior to any chromium specie are deposited onto it. The support is dried by heating or pre-drying of the support with an inert gas prior to use thereof in the catalyst synthesis, in the manner known to those skilled in the art, e.g., at about 200° C. for about 8 to about 16 hours.

The most preferred refractory oxide support material is silica having deposited thereon about 0.18% by weight of chromium trioxide ($CrO_3$) and having about 88% pore volume in the pores of about 250 to about 450 Angstrom diameter, particle diameter of about 10 to about 200 microns, available commercially from Joseph Crosfield & Sons Ltd., Applied Silicas Division, Warrington, England, under the tradename of SD-186.

The first chromium species is $CrO_3$ or any compound of chromium calcinable to $CrO_3$ under the catalyst activation conditions.

Chromium compounds, other than $CrO_3$, which may be used are disclosed in U.S. Pat. Nos. to Hogan et al., 2,825,721 and 3,622,521, the entire disclosures of which are incorporated herein by reference, and include chromium nitrate, chromium carbonate, chromium acetate, ammonium chromate, chromium chloride, tertiary butyl chromate, chromium acetylacetonate, and chromium sulphate.

Water soluble compounds of chromium, such as $CrO_3$, are the preferred compounds used to deposit the first chromium species onto the support. However, organic solvents-soluble chromium compounds may also be used. After $CrO_3$ or a compound of chromium calcinable to $CrO_3$ is deposited on the support, it is activated at an elevated temperature in the manner conventional for Phillips catalysts, i.e., at a temperature of at least about 600° C., preferably about 600° C. to about 870° C. for at least about 10 hours (hrs), preferably at least about 14 hrs, and more preferably about 7 to about 16 hrs, to obtain an active catalyst composition.

The first chromium species is usually deposited onto the support from a solution thereof.

The second chromium species is deposited onto the support after the first chromium species. The second chromium species of the catalyst composition of this invention is any silylchromate compound. In the most preferred embodiment, the second chromium species is any one or a combination of silylchromate compounds disclosed by Baker et al, U.S. Pat. No. 3,324,101, Johnson, U.S. Pat. No. 3,704,287, and by Carrick et al, U.S. Pat. No. 3,324,095, the entire contents of all of which are incorporated herein by reference. For the sake of convenience, the second chromium species will hereinafter be described in conjunction with the description thereof of Baker et al, Johnson and Carrick et al. However, it will be understood by those skilled in the art that the invention is not limited to the use of that particular silylchromate, and that any silylchromates may be used as the second chromium species of the catalyst composition of this invention.

Briefly, the silylchromate of Baker et al comprises a compound containing both silicon and chromium elements in the single molecule. Suitable silylchromate compounds are characterized by the presence therein of the group of the formula

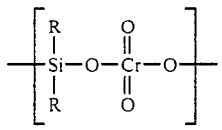

wherein R is a hydrocarbyl group having from 1 to 14 carbon atoms. Among the preferred compounds containing that group are the bis-trihydrocarbylsilylchromates of the formula

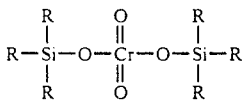

wherein R is as defined above. R can be any hydrocarbon group, such as an alkyl, alkaryl, aralkyl or an aryl radical containing from 1 to about 14 carbon atoms, preferably from about 3 to about 10 carbon atoms. Illustrative R groups are methyl, ethyl, propyl, iso-propyl, n-butyl, iso-butyl, n-pentyl, iso-pentyl, t-pentyl, hexyl, 2-methyl-pentyl, heptyl, octyl, 2-ethylhexyl, nonyl, decyl, hendecyl, dodecyl, tridecyl, tetradecyl, benzyl, phenethyl, p-methylbenzyl, phenyl, tolyl, xylyl, naphthyl, ethylphenyl, methylnaphthyl, and dimethylnaphthyl. Illustrative of the preferred silylchromates are such compounds as bis-trimethylsilylchromate, bis-triethylsilylchromate, bis-tributylsilylchromate, bis-triisopentylsilylchromate, bis-tri-2-ethylhexylsilylchromate, bis-tridecylsilylchromate, bis-tri(tetradecyl)silylchromate, bis-tribenzylsilylchromate, bis-triphenethylsilylchromate, bis-triphenylsilylchromate, bis-tritolylsilylchromate, bis-trixylylsilylchromate, bis-trinaphthylsilylchromate, bis-triethylphenylsilylchromate, bis-trimethylnaphthylsilylchromate, polydiphenylsilylchromate, polydiethylsilylchromate.

While both the aryl- and alkyl-substituted silylchromates can be used, the arylsilylchromates are more preferred. The alkylsilylchromates because of their instability and in some instances because they may be spontaneously explosive, should be handled with extreme caution, and preferably in solution or in an inert atmosphere or both.

The bis-trihydrocarbylsilylchromates also have the advantageous property of being thermally stable when, as indicated above, the hydrocarbyl portion is an aromatic group and in many instances they can be handled in the presence of atmospheric moisture for periods up to several hours. These compounds are well known in the art.

In many instances, these silylchromate compounds, e.g., bis-triphenylsilylchromate, are soluble in organic hydrocarbon liquids, e.g., hexane, and can be easily deposited onto the support from the solution thereof.

It will be apparent to those skilled in the art that the catalyst composition of this invention may also contain any ingredients other than the aforementioned first or second chromium specie or titanium compounds, so long as such other ingredients do not have detrimental effect on the catalyst composition's catalytic properties. Thus, for example, it may contain fluorine, as disclosed by Levine et al, U.S. Pat. No. 4,011,382, incorporated herein by reference.

Thus, the amount of the second chromium species used in the catalyst synthesis is such that the final catalyst composition contains about 0.03 to about 11, preferably about 0.07 to about 0.9, more preferably about 0.09 to about 0.7, and most preferably about 0.10 to about 0.7% wt. of chromium, calculated as elemental chromium, from the second chromium species. The amount of the second chromium species used during the synthesis is such that the weight ratio of the second chromium species to the first chromium species in the catalyst composition is about 0.7 to about 3.7. Accordingly, the weight ratio of the chromium from the second chromium species to the chromium from the first chromium species in the catalyst composition is about 0.7 to about 3.7.

The catalyst of this invention is preferably modified, in accordance with the teachings of Carrick et al, by the addition thereto of a small amount of an organo-aluminum compound having one or two oxyhydrocarbyl groups attached to the aluminum atom. The resulting modified catalyst composition provides positive control of the melt index of the polymers. The preferred organo-aluminum compounds are represented by the formula:

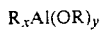

$R_xAl(OR)_y$ in which x and y are integers from 1 to 2 inclusive and x+y=3, and R is a hydrocarbyl group containing from 1 to about 14 carbon atoms. The nature of the hydrocarbyl group R is not critical and it can be any hydrocarbyl group, such as alkyl, aralkyl, aryl, alkaryl, alicyclic, bicyclic and similar hydrocarbyl groups. Illustrative of such groups are methyl, ethyl, propyl, iso-propyl, n-butyl, iso-butyl, n-pentyl, iso-pentyl, t-pentyl, hexyl, cyclohexyl, 2-methylpentyl, heptyl, octyl, 2-ethylhexyl, cyclohexylmethyl, nonyl, decyl, undecyl, dodecyl, tridecyl, tetradecyl, benzyl, pinyl, pinylmethyl, phenethyl, p-methylbenzyl, phenyl, tolyl, xylyl, naphthyl, ethylphenyl, methylnapthyl, dimethylnaphthyl, norbornyl, norbornyl methyl or any such similar hydrocarbyl groups. The compounds having R groups directly bonded to the aluminum atom containing 1 to 8 carbon atoms are preferred. The R groups can be the same or different.

The one or two oxyhydrocarbyl groups also attached to the aluminum atom are obtained preferably by direct interaction between the hydrocarbon alcohol or phenol corresponding to the desired oxyhydrocarbyl groups and an aluminum trihydrocarbon corresponding to the hydrocarbyl group desired in the compound.

If desired, the oxyhydrocarbyl aluminum compounds can be generated in situ in the system by the presence of a small but stoichiometrically calculated amount of the desired alcohol with the trihydrocarbyl aluminum immediately prior to the polymerization.

While it is obviously contemplated from the above that aryl and hydrocarbon substituted aryl moieties can be present as the OR group of the aluminum compound, such compounds will be referred to hereinafter as "aluminum alkoxides" because of ease of nomenclature. Thus, reference to the aluminum alkoxide hereinafter is intended to include all of the above-identified materials coming within the scope of the above description.

There are several trihydrocarbyl aluminum compounds which can be used to obtain the organoaluminum compounds having one or two oxyhydrocarbynum groups, e.g., triethylaluminum, triisobutylaluminum, and tri-n-propylaluminum. Of these, the triethylaluminum is preferred.

The oxyhydrocarbyl or alkoxide moiety of these compounds imparts a much greater effect in the process and in the control of polymer molecular weight than does the hydrocarbyl moiety. Depending on the size, nature and character of the alkoxide, different results can be expected. Differing degrees of control of melt index are possible by the particular selection of the alkoxide group or groups.

It is also known that dialkylaluminum monoalkoxides are more effective than are the dialkoxides in that they produce a catalyst having higher rates of polymerization. Aluminum trialkoxides are so nearly insoluble as to be inoperative by themselves but when disproportionated with an aluminum alkyl into a monoalkoxide or a dialkoxide, they can be used as the source of the oxyhydrocarbyl compounds used herein. In like manner the dialkoxides can be disproportionated with aluminum alkyls into a mixture containing the monoalkoxide.

Thus, any desired combination of alkoxide and hydrocarbon groups attached to the aluminum atom is possible. Most particularly preferred of these compounds is the diethyl-aluminum ethoxide since it produces a very highly active catalyst producing a relatively high melt index polymer.

The amount of the aluminum alkoxide is not critical but it must be sufficient to reduce a certain portion of the chromium specie to the active catalytic form. Even amounts as low as about 0.2 mole of the aluminum alkoxide per mole of elemental chromium can be used, although amounts greater than equimolar are preferred, and more preferred are the amounts from about 5 to 20 moles of the aluminum alkoxide per mole of elemental chromium. Little additional benefit is obtained in rate or yield by using greater amounts, but excess alkoxide is not harmful in the process. The catalyst is contacted with the aluminum alkoxide after the deposition of the second chromium species is completed. Finally, the catalyst is dried in any suitable manner, e.g., in a nitrogen atmosphere for about 2 to about 15 hours.

As is clear from the above discussion, both chromium species are sequentially deposited on the same support to produce the catalyst composition of this invention. Because the first chromium species must be activated by the heat treatment described above, it is initially deposited on the support and activated, and the second chromium species is subsequently deposited on the same support.

The catalyst may also comprise a titanium compound or compounds. Suitable titanium compounds which may be used include all titanium compounds which are oxidizable to $TiO_2$ under the activation conditions employed to activate the first chromium species, and include those disclosed by Hogan et al, U.S. Pat. No. 3,622,521, Levine et al, U.S. Pat. No. 4,011,382, Netherlands Patent Application 72-10881, and by Hsieh et al, U.S. patent application Ser. No. 339,955, filed Apr. 18, 1989 now abandoned (the disclosures of all of which are incorporated herein by reference). These compounds include those having the structures $(R_1)_nTi(OR_1)_m$, $(R_2O)_mTi(OR_1)_n$, $(R_1)_nTiX_m$, $(RO)_nTiX_m$ and $TiX_4$ where m is 1, 2, 3 or 4, n is 0, 1, 2 or 3 and m+n=4;

$R_1$ is a $C_1$ to $C_{12}$ alkyl, aryl or cycloalkyl group, or combinations thereof, such as aralkyl and alkaryl groups;

$R_2$ is $R_1$, a cyclopentadienyl group, $C_2$ to $C_{12}$ alkenyl groups, such as ethenyl, propenyl, isopropenyl or butenyl; and, X is chlorine, bromine, fluorine or iodine.

The titanium compounds thus include titanium tetrachloride, titanium tetraisopropoxide and titanium tetrabutoxide. The most preferred titanium compound is tetraisopropyltitanate. The titanium compounds are conveniently deposited on the refractory oxide support from a hydrocarbon solvent solution thereof. The amount of the titanium compound used is such that there is preferably a molar excess of titanium (calculated as elemental titanium) with respect to both chromium specie (calculated as elemental chromium). Thus, the titanium (calculated as elemental titanium) is present in the catalyst, with respect to the chromium (calculated as elemental chromium) derived from both the first and the second chromium specie, in a molar ratio of about 0.5 to about 180, and preferably about 4 to about 35.

The titanium compound is deposited onto the support at any point during the catalyst synthesis, but preferably it is deposited after the deposition of the first chromium species is completed. After the titanium compound is deposited onto the support, the resulting solid material is activated at an elevated temperature in the manner discussed above. As will be apparent to those skilled in the art, if titanium is used in the catalyst synthesis, the catalyst is thermally activated only once, after the deposition of the titanium is completed but it is not activated after the first chromium species is deposited onto the support.

If a titanium compound is used, the catalyst contains, based on the combined weight of the support, the chromium and titanium therein, about 0.05 to about 3.0, preferably about 0.10 to about 0.25, more preferably about 0.13 to about 0.18 and most preferably about 0.15 to about 0.18 weight percent of chromium (% wt. Cr; calculated as elemental chromium), and about 1.5 to about 9.0, preferably about 3.0 to about 7.0, and most preferably about 3.7 to about 6.0% wt. of titanium (Ti; calculated as elemental titanium).

POLYMERIZATION

The catalyst composition of this invention is used to polymerize either ethylene alone or ethylene in conjunction with higher monomers, such as any one of $C_3-C_{10}$ alpha-olefins, e.g., 1-butene, 1-pentene, 1-hexene, 4-methyl-1-pentene, 1-heptene or 1-octene, preferably 1-butene, 1-pentene, 1-hexane or 4-methyl-1-pentene and most preferably 1-hexene. The polymerization reaction may be carried out using any suitable, conventional olefin polymerization process, such as a slurry, particle form or vapor phase, e.g., fluid bed reactor, but preferably it is carried out in a vapor phase, fluid bed reactor. The reaction is conducted substantially in the absence of catalyst poisons, such as moisture, carbon monoxide and acetylene, with a catalytically effective amount of the catalyst at a temperature and pressure conditions sufficient to initiate the polymerization reaction. A particularly desirable method for producing polymers according to the present invention is in a fluid bed reactor. Such a reactor and means means for operating it are described by Levine et al, U.S. Pat. No. 4,001,382, Karol et al, U.S. Pat. No. 4,302,566, and Nowlin et al, U.S. Pat. No. 4,481,301, the entire contents of all of which are incorporated herein by reference. The polymer produced in such a reactor contains catalyst particles since the catalyst is not separated from the polymer.

In order to achieve density ranges of about 0.915 to about 0.965 g/cc in the copolymers, which includes the range of about 0.947 to about 0.959 g/cc of the preferred products made with the catalyst of this invention, it is necessary to copolymerize enough of the $C_3$ or higher comonomers with ethylene to achieve a level of about 0.1 to about 25 mole percent of the $C_3$ to $C_{10}$ comonomer in the copolymer. The amount of comonomer needed to achieve this result will depend on the particular comonomer(s) being employed. Further, the various intended comonomers have different reactivity rates, relative to the reactivity rate of ethylene, with respect to the copolymerization thereof with the catalysts of the present invention. Therefore, the amount of comonomer used in the stream of monomers fed to the reactor will also vary depending on the reactivity of the comonomer.

In the most preferred embodiment, the catalyst of the present invention is used to polymerize 1-hexane and ethylene to obtain polymers having the density of about 0.947 to about 0.959 g/cc, and high load melt index (HLMI), $I_{21}$, values of about 4 to about 12, preferably about 6 to about 8, which are especially suitable for the production of high strength films.

Hydrogen may be used in the polymerization reaction of the present invention in such amounts that the ratio of hydrogen to ethylene is between about 0 to about 2.0 moles of hydrogen per mole of the ethylene monomer in the gas stream. Any gas inert to the catalyst and reactants may also be present in the feed stream.

For the production of copolymers of ethylene with $C_3-C_{10}$ alpha-olefins in the process of the present invention, an operating temperature of about 30° to about 120° C. is preferred, and a temperature of about 85° to about 120° C. is most preferred.

The following Examples further illustrate the essential features of the invention. However, it will be apparent to those skilled in the art that the specific reactants and reaction conditions used in the Examples do not limit the scope of the invention.

The properties of the polymers produced in the Examples were determined by the following test methods:

| | |
|---|---|
| Density | ASTM D-1505 - A plaque is made and conditioned for one hour at 100° C. to approach equilibrium crystallinity. Measurement for density is then made in a density gradient column; reported as gms/cc. |
| Melt Index (MI), $I_2$ | ASTM D-1238 - Condition E - Measured at 190° C. - reported as grams per 10 minutes. |
| High Load Melt Index (HLMI), $I_{21}$ | ASTM D-1238 - Condition F - Measured at 10 times the weight used in the melt index test above, reported as grams per 10 minutes. |
| Melt Flow Ratio (MFR) = $\frac{I_{21}}{I_2}$ | |
| Dart Drop | ASTM D-1709, reported as F50 value, in grams |
| Elmendorf Tear, MD | ASTM D-1922, reported in g/mil |
| Elmendorf Tear, TD | ASTM D-1922, reported in g/mil |

EXAMPLE 1

Catalyst Synthesis

The two chromium specie catalyst composition of this invention, supported on a single refractory oxide support, was prepared in the multi-step procedure summarized below.

The reactants listed below were used in the catalyst synthesis.

| REACTANTS | AMOUNT |
|---|---|
| 1. Isopentane | 4 l |
| 2. Crosfield SD-186 silica (contains 0.18% wt. chromium oxide) | 663 g |
| 3. Hexane | 5 l |
| 4. Bis-triphenylsilylchromate | 22.9 g |
| 5. Diethylaluminum ethoxide (DEAEO-24.8% in heptane) | 65.7 ml |

1. Silica Dehydration

About 600 gram of Crosfield's SD-186 silica, containing 0.18% wt. of chromium oxide, was dehydrated in a 5" diameter activator at 200° C. for 4 hours under nitrogen. The silica was slurried in 4 liters of purified isopentane at room temperature for one hour, then heated to 50° C. and purged with nitrogen for 5 hours. The dry silica was further dehydrated at 600° C. in a 5" activator. The activator temperature schedule is set forth below:

| TEMPERATURE, °C. | TIME or RATE | FLUIDIZING GAS |
|---|---|---|
| Ambient to 200 | 3 hrs | Nitrogen |
| hold at 200 | 2 hrs | Nitrogen |
| 200 to 310 | 2 hrs | Nitrogen |
| hold at 310 | 2 hrs | $N_2$ to air |
| 310 to 600 | 4 hrs | air |
| hold at 600 | 7 hrs | air |
| 600 to 150 | As fast as possible | air |
| hold at 150 | As fast as possible | air to $N_2$ |
| 150 to ambient | As fast as possible | Nitrogen |

2. Silylchromate Adsorption:

About 663 g of the dehydrated SD-186 silica was suspended in 5 liter of hexane under nitrogen at 50° C. To the resulting mixture was added 22.9 gram of bis-triphenylsilylchromate and the mixture was stirred for one hour.

3. Organoaluminum Addition:

65.7 ml of 24.8% DEAEO (diethylaluminum ethoxide) solution in heptane was added to the mixture and stirred for an additional 0.5 hour at 50° C.

4. Catalyst Drying:

The catalyst was purged with nitrogen at 70° C. for 5 hours. About 665 g of the final catalyst was obtained. Total chromium loading was about 0.41 wt %.

EXAMPLE 2

Polymerization of Ethylene With 1-Hexene

The catalyst composition of Example 1 was used in an 18 inch outside diameter gas phase fluid bed reactor to copolymerize ethylene with 1-hexene. The reactor was constructed and operated substantially in the manner of the fluid bed reactor described in the aforementioned Patent of Levine et al, Karol et al, U.S. Pat. No. 4,302,566, and Nowlin et al, U.S. Pat. No. 4,481,301, the contents of the latter two patents being incorporated herein by reference.

the reactor operating conditions are listed below.

TABLE A

| Fluid Bed Polymerization Reactor Conditions | |
|---|---|
| Gas Phase Hexene/Ethylene Molar Ratio | 0.0026 |
| Gas Phase $H_2/C_2$=molar ratio | 0.12 |
| Polymerization Temperature (°C.) | 98 |
| Ethylene Partial Pressure, psi | 170 |
| Reactor Pressure psig | 310 |
| Oxygen add-back (ppm) | 0.05 |
| Polymer Production Rate (lbs/hr) | 30 |

The polymer product had a density of 0.948 g/cc, $I_{21}$ of 7 g/10 min and MFR of 110.

EXAMPLE 3

Chromium Oxide-Containing Catalyst

A catalyst composition containing chromium oxide as the only chromium species, having the tradename SD-186 was obtained from Joseph Crosfield & Sons Ltd.

EXAMPLE 4

Silylchromate-Containing Catalyst

A catalyst composition containing silylchromate as the only chromium species was synthesized substantially in accordance with the procedure of Baker et al, U.S. Pat. No. 3,324,101.

EXAMPLES 5-6

HDPE Preparation in Fluid Bed Reactor

The catalyst compositions of Examples 3 and 4 were used to produce HDPE in the pilot plant, fluid bed reactor of Example 3. The polymerization conditions are listed below.

TABLE B

| Fluid Bed Polymerization Reactor Conditions | | |
|---|---|---|
| Example | 5 | 6 |
| Catalyst of Example | 3 | 4 |
| Gas Phase Hexene/Ethylene | 0.001 | 0.0049 |

TABLE B-continued

| Fluid Bed Polymerization Reactor Conditions | | |
|---|---|---|
| Example | 5 | 6 |
| Molar Ratio Gas Phase $H_2/C_2$=molar ratio | 0.19 | 0.039 |
| Polymerization Temperature (°C.) | 97 | 95 |
| Ethylene Partial Pressure, psi | 180 | 215 |
| Reactor Pressure, psig | 310 | 310 |
| Oxygen add-back | Nil | Nil |
| Polymer Production Rate (lbs/hr) | 30 | 30 |
| Density (g/cc) | 0.948 | 0.948 |
| $I_{21}$ (g/10 min) | 7.6 | 9 |
| MFR | 111 | 122 |

EXAMPLES 7-9

Film Preparation

The polymer resins of Examples 2, and 5-6 were used to produce 1.0 mil film on a 50 mm Alpine Film line equipped with 100 mm (1 mm die gap) high pressure die under standard conditions for all examples, and the strength properties of all three films were evaluated. The results of the evaluation are summarized below in Table C.

TABLE C

| Example | 7 | 8 | 9 |
|---|---|---|---|
| Resin of Example | 2 | 5 | 6 |
| Dart Drop, F50(g) | 288 | 129 | 139 |
| Elmendorf Tear (g/mil) | | | |
| MD | 19 | 12 | 15 |
| TD | 81 | 63 | 161 |
| Bubble Stability | Excellent | Good | Good |

The data of Table C indicates that the two chromium specie catalyst of this invention produces 1.0 mil films having substantially improved strength properties (measured by the Dart Drop test), as compared to the film produced either with the chromium oxide-only or the silylchromate-only containing catalysts, and better Elmendorf Tear properties than the film produced with the chromium oxide-only containing catalyst. The processability (melt fractures) and bubble stability of the resin of Example 7 were also excellent, as is evidenced by the film extrusion performance under conditions described in Examples 7-9.

It will be apparent to those skilled in the art that the specific embodiments discussed above can be successfully repeated with ingredients equivalent to those generically or specifically set forth above and under variable process conditions.

From the foregoing specification, one skilled in the art can readily ascertain the essential features of this invention and without departing from the spirit and scope thereof can adapt it to various diverse applications.

What is claimed is:

1. A refractory oxide-supported olefin polymerization catalyst composition comprising two chromium specie: (1) $CrO_3$ or any compound of chromium calcinable to $CrO_3$; and (2) at least one silylchromate compound.

2. A catalyst composition of claim 1 wherein the weight ratio of the chromium species (2) to the chromium species (1) is about 0.7 to about 3.7.

3. A catalyst composition of claim 2 additionally comprising an organoaluminum compound having one or two oxyhadrocarbyl groups attached to the aluminum atom.

4. A catalyst composition of claim 3 wherein the silylchromate compound is characterized by the presence therein of the group of the formula

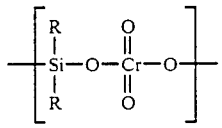

wherein R is a hydrocarbyl group having 1 to 14 carbon atoms.

5. A catalyst composition of claim 4 wherein the silylchromate compound is a bis-trihydrocarbyl silylchromate of the formula

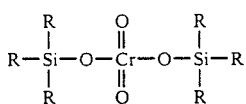

wherein R is a hydrocarbyl group having 1 to 14 carbon atoms.

6. A method of preparing a refractory oxide-supported olefin polymerization catalyst composition comprising depositing onto a support material a first chromium species which is $CrO_3$ or any compound of chromium calcinable to $CrO_3$ to produce the first chromium species-containing support, activating the first chromium species-containing support, and depositing onto the support a second chromium species which is at least one silylchromate compound.

7. A catalyst composition of claim 5 wherein the support is silica, silica-alumina, silica-titania, alumina, zirconia or thoria.

8. A catalyst composition of claim 7 wherein the support is silica having deposited theron about 0.18% wt. of chromium trioxide ($CrO_3$) and having about 88% of its pore volume in the pores of about 250 to about 450 Angstrom diameter.

9. A catalyst composition of claim 8 wherein each R in the silylchromate compound is an alkyl, alkaryl, aralkyl or an aryl radical containing 3 to 10 carbon atoms.

10. A catalyst composition of claim 9 wherein each R in the silylchromate compound is selected from the group consisting of methyl, ethyl, propyl, iso-propyl, n-butyl, iso-butyl, n-pentyl, iso-pentyl, t-pentyl, hexyl, 2-methyl-pentyl, heptyl, octyl, 2-ethylhexyl, nonyl, decyl, hendecyl, dodecyl, tridecyl, tetradecyl, benzyl, phenethyl, p-methylbenzyl, phenyl, tolyl, xylyl, naphthyl, ethylphenyl, methylnaphthyl, and dimethylnaphthyl.

11. A catalyst composition of claim 10 wherein the silylchromate compound is selected from the group consisting of bis-trimethylsilylchromate, bis-triethylsilylchromate, bis-tributylsilylchromate, bis-triisopentylsilylchromate, bis-tri-2-ethylhexylsilylchromate, bis-tridecylsilylchromate, bis-tri(tetradecyl)silylchromate, bis-tribenzylsilylchromate, bis-triphenethylsilylchromate, bis-triphenylsilylchromate, bis-tritolylsilylchromate, bis-trixylylsilylchromate, bis-trinaphthylsilylchromate, bis-triethylphenylsilylchromate, bis-trimethylnaphthylsilylchromate, polydiphenylsilylchromate, and polydiethylsilylchromate.

12. A catalyst composition of claim 11 wherein the silylchromate compound is bis-triphenylsilylchromate.

13. A catalyst composition of claim 12 wherein the organoaluminum compound has the formula $$R_xAl(OR)_y$$

wherein x and y are integers from 1 to 2, inclusive, x+y=3, and R is a hydrocarbyl group containing 1 to about 14 carbon atoms.

14. A catalyst composition of claim 13 wherein each R in the organoaluminum compound is the same or different and it is selected from the group consisting of alkyl, aralkyl, aryl, alkaryl, alicyclic or bicyclic groups.

15. A catalyst composition of claim 14 wherein each R in the organoaluminum compound is selected from the group consisting of methyl, ethyl, propyl, iso-propyl, n-butyl, iso-butyl, n-pentyl, iso-pentyl, t-pentyl, hexyl, cyclohexyl, 2-methylpentyl, heptyl, octyl, 2-ethylhexyl, cyclohexylmethyl, nonyl, decyl, undecyl, dodecyl, tridecyl, tetradecyl, benzyl, pinyl, pinylmethyl, phenethyl, p-methylbenzyl, phenyl, tolyl, xylyl, naphthyl, ethylphenyl, methylnaphthyl, dimethylnaphthyl, norbornyl, and norbornyl methyl.

16. A catalyst composition of claim 15 wherein the organoaluminum compound is diethyl-aluminum ethoxide.

17. A method of claim 6 wherein the weight ratio of the chromium species (2) to the chromium species (1) is about 0.7 to about 3.7.

18. A method of claim 17 wherein the catalyst composition additionally comprises an organoaluminum compound having one or two oxyhydrocarbyl groups attached to the aluminum atom.

19. A method of claim 18 wherein the silylchromate compound is characterized by the presence therein of the group of the formula

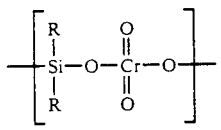

wherein R is a hydrocarbyl group having 1 to 14 carbon atoms.

20. A method of claim 19 wherein the silylchromate compound is a bis-trihydrocarbyl silylchromate of the formula

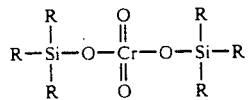

wherein R is a hydrocarbl group having 1 to 14 carbon atoms.

21. A method of claim 20 wherein the support is silica, silica-alumina, silica-titania, alumina, zirconia or thoria.

22. A method of claim 21 wherein the support is silica having deposited theron about 0.18% wt. of chromium trioxide (CrO3) and having about 88% of its pore volume in the pores of about 250 to about 450 Angstrom diameter.

23. A method of claim 22 wherein each R in the silylchromate compound is an alkyl, alkaryl, aralkyl or an aryl radical containing 3 to 10 carbon atoms.

24. A method of claim 23 wherein each R in the silylchromate compound is selected from the group consisting of methyl, ethyl, propyl, iso-propyl, n-butyl, iso-butyl, n-pentyl, iso-pentyl, t-pentyl, hexyl, 2-methylpentyl, heptyl, octyl, 2-ethylhexyl, nonyl, decyl, hendecyl, dodecyl, tridecyl, tetradecyl, benzyl, phenethyl, p-methylbenzyl, phenyl, tolyl, xylyl, naphthyl, ethylphenyl, methylnaphthyl, and dimethylnaphthyl.

25. A method of claim 24 wherein the silylchromate compound is selected from the group consisting of bis-trimethylsilylchromate, bis-triethylsilylchromate, bis-tributylsilylchromate, bis-triisopentylsilylchromate, bis-tri-2-ethylhexylsilylchromate, bis-tridecylsilylchromate, bis-tri(tetradecyl)silylchromate, bis-tribenzylsilylchromate, bis-triphenethylsilylchromate, bis-triphenylsilylchromate, bis-tritolylsilylchromate, bis-trixylylsilylchromate, bis-trinaphthylsilylchromate, bis-triethylphenylsilylchromate, bis-trimethylnaphthylsilylchromate, polydiphenylsilylchromate, polydiethylsilylchromate.

26. A method of claim 25 wherein the silylchromate compound is bis-triphenylsilylchromate.

27. A method of claim 26 wherein the organoaluminum compound has the formula $$R_xAl(OR)_y$$

wherein x and y are integers from 1 to 2, inclusive, x+y=3, and R is a hydrocarbyl group containing 1 to about 14 carbon atoms.

28. A method of claim 27 wherein each R in the organoaluminum compound is the same or different and it is selected from the group consisting of alkyl, aralkyl, aryl, alkaryl, alicyclic or bicyclic groups.

29. A method of claim 28 wherein each R in the organoaluminum compound is selected from the group consisting of methyl, ethyl, propyl, iso-propyl, n-butyl, iso-butyl, n-pentyl, iso-pentyl, t-pentyl, hexyl, cyclohexyl, 2-methylpentyl, heptyl, octyl, 2-ethylhexyl, cyclohexylmethyl, nonyl, decyl, undecyl, dodecyl, tridecyl, tetradecyl, benzyl, pinyl, pinylmethyl, phenethyl, p-methylbenzyl, phenyl, tolyl, xylyl, naphthyl, ethylphenyl, methylnaphthyl, dimethylnaphthyl, norbornyl, and norbornyl methyl.

30. A method of claim 29 wherein the organoaluminum compound is diethyl-aluminum ethoxide.

* * * * *